(12) United States Patent
Ounadjela (10) Patent No.: US 7,562,740 B2
(45) Date of Patent: Jul. 21, 2009

(54) BOREHOLE ACOUSTIC SOURCE (75) Inventor: Abderrhamane Ounadjela, Ridgefield, CT (US)

(73) Assignee: Schlumberger Technology Corporation, Ridgefield, CT (US)

( * ) Notice: Subject to any disclaimer, the term of this patent is extended or adjusted under 35 U.S.C. 154(b) by 284 days.

(21) Appl. No.: 10/695,078

(22) Filed: Oct. 28, 2003

(65) Prior Publication Data

US 2005/0087391 A1     Apr. 28, 2005

(51) Int. Cl.
*G01V 1/04* (2006.01)
(52) U.S. Cl. ................... 181/121; 181/124; 181/113
(58) Field of Classification Search ........... 181/121, 181/113, 124, 101, 108, 111, 112, 122, 106; 324/323; 367/14; 166/249, 118, 119, 134
See application file for complete search history.

(56) References Cited

U.S. PATENT DOCUMENTS

| | | | | |
|---|---|---|---|---|
| 3,221,833 A | * | 12/1965 | Malmberg | 181/106 |
| 4,222,455 A | * | 9/1980 | Lerwill | 181/121 |
| 4,383,591 A | * | 5/1983 | Ogura | 181/106 |
| 4,505,362 A | | 3/1985 | Layotte et al. | 188/67 |
| 4,616,703 A | * | 10/1986 | Laurent et al. | 166/66.4 |
| 4,651,044 A | | 3/1987 | Kompanek | 310/323 |
| 4,682,308 A | * | 7/1987 | Chung | 367/31 |
| 4,700,803 A | * | 10/1987 | Mallett et al. | 181/106 |
| 4,712,641 A | * | 12/1987 | Chelminski | 181/113 |
| 4,715,470 A | * | 12/1987 | Paulsson | 181/106 |
| 4,805,725 A | * | 2/1989 | Paulsson | 181/106 |
| 4,926,937 A | * | 5/1990 | Hademenos | 166/206 |
| 5,000,285 A | * | 3/1991 | Airhart | 181/113 |
| 5,080,189 A | * | 1/1992 | Cole | 181/106 |
| 5,113,966 A | * | 5/1992 | Gregory et al. | 181/106 |
| 5,160,814 A | * | 11/1992 | Petermann | 181/106 |
| 5,187,331 A | * | 2/1993 | Sakata | 181/121 |
| 5,228,011 A | | 7/1993 | Owen | 367/147 |
| 5,309,405 A | * | 5/1994 | Brett et al. | 367/36 |
| 5,382,760 A | * | 1/1995 | Staron et al. | 181/121 |
| 6,315,075 B1 | * | 11/2001 | Nakajima | 181/102 |
| 2003/0205428 A1 | | 11/2003 | Chang | 181/108 |

OTHER PUBLICATIONS

Balogh, W.T., Owen, T.E. and Harris, J.M. *New Piezoelectric Transducer for Hole-to-hole Seismic Applications*. 58 Ann. Int'l Mtg. Soc. of Expl. Geophys. Anaheim, CA (Oct. 30-Nov. 3, 1988).

(Continued)

*Primary Examiner*—Jeffrey Donels
*Assistant Examiner*—Forrest M Phillips
(74) *Attorney, Agent, or Firm*—Jody DeStefanis; Vincent Loccisano; James McAleenan (57) ABSTRACT

The present invention discloses an acoustic borehole source and method of using the source for generating elastic waves through an earth formation that may be used for logging or permanent installations. The acoustic source is comprised of a first motorized reaction mass and at least two pads, each pad connected to the sonde and the motorized reaction mass using pushing rods. In an alternate embodiment, the source has a first and second motorized reaction mass and at least two pads. The motorized reaction masses may be activated to allow the pads to move at an angle α relative to the axis of the sonde. In a third embodiment, the acoustic borehole source includes additional pairs of motorized reaction masses so that pads may be independently activated.

57 Claims, 6 Drawing Sheets (a)

OTHER PUBLICATIONS

Deflandre, J.P., Laurent, J. and Blondin, E. *Use of Permanent Geophone for Microseismic Surveying of a Gas Storage Reservoir.* 55th EAGE Meeting, Jun. 7-11, 1993.

Dumont, M-H., Fayemendy, C., Mari, J-L. and Huguet, F. *Underground Gas Storage: Estimating Gas Column Height and Saturation with Time Lapse Seismic..* Petroleum Geoscience, vol. 7 (2001) pp. 155-162.

Kennedy, W., Wiggins, W. Aronstam, P. and Hardage, R.A. *A Swept-Frequency Borehole Source for Inverse VSP and Cross-Borehole Surveying*: 7th Geophysical Conference, Austr. Soc. Expl. Geophys. 20, 133-136.

Meunier, J., Huguet, F., Meynier, P. *Reservoir Moniitoring Using Permanent Sources and Vertical Receiver Antennae: The Céré-la-Ronde Case Study.* The Leading Edge (Jun. 2001) pp. 622-629.

Owen, T.E., Thomas, B. and Peters, W.R. *Arc Discharge Pulse Source for Borehole Seismic Applications.* 58th Ann. Int'l Mtg: Soc. of Expl. Geophys., Session:DEV2.4, pp. 151-154.

Paulsson, B.N.P., Meredith, J.A., Wang, Z. and Fairborn, J.W. The Steepbank Crosswell Seismic Project: Reservoir Definition and Evaluation of Streamflood Technology in Alberta Tar Sands. *The Leading Edge* (Jul. 1994) pp. 737-747.

Turpening, R. and Krasovec, M. Imaging with Reverse Vertical Seismic Profiles Using a Downhole, Hydraulic, Axial Vibrator. 62nd Mtg. Eur. Assn. Geosci. Eng., Session:P0161.

Ziolkowksi, A., Sneddon, Z. and Walter, L. *Determination of Tube-Wave to Body-Wave Ratio for Conoco Borehole Orbital Source.* 69th Ann. Int'l Mtg.: Soc. of Expl. Geophys., pp. 156-159.

* cited by examiner

BOREHOLE ACOUSTIC SOURCE

FIELD OF THE INVENTION

The present invention relates to borehole acoustic sources, and more particularly, to a borehole acoustic source, which is clamped against the borehole wall.

BACKGROUND TECHNOLOGY

Downhole seismic sources are used to determine underground geological characteristics in the region surrounding the well in which the source is placed. They are designed to create acoustic waves and to transmit these waves as fully as possible to the inside wall of the well. Receivers such as accelerometers, geophones, or hydrophones detect these acoustic waves after they have passed through the subsoil. The measured waves serve to determine the characteristics of the underground formations passed through.

Conventional acoustic sources generate seismic waves from the surface. These surface seismic sources operate at low frequency resulting in low resolution surveys. A few downhole seismic sources have been developed which generate acoustic waves into the formation through a borehole medium. These downhole sources operate at a higher frequency than surface sources but do not generate enough energy to result in accurate surveys. Accordingly, these downhole sources tend to suffer from poor signal to noise ratios. Further, much of the acoustic energy remains in the well as tube waves and does not penetrate the earth formation.

Conventional downhole sources include:
- the cylindrical bender source using piezoelectric ring bonded on a tube developed by Southeast Research Institute and described in Balogh et al.'s, "New Piezoelectric Transducer for Hole-to-Hole Seismic Applications," 58th Annual International Meeting of the Society of Exploration Geophysics (1988), Session DEV2.5 (incorporated by reference herein in its entirety);
- the electroacoustic transducer cylindrical bender source developed by Kompanek and described in U.S. Pat. No. 4,651,044 (incorporated by reference herein in its entirety);
- the arc discharge pulse source developed by Southwestern Research Institute as described in U.S. Pat. No. 5,228,011 (incorporated by reference herein in its entirety);
- the swept frequency borehole source developed by Western Atlas and described in Owen et al.'s, "Arc Discharge Pulse Source for Borehole Seismic Applications," 58th Annual International Meeting of the Society of Exploration Geophysics (1988), Session DEV2.4 (incorporated by reference herein in its entirety);
- the potential energy "drop mass" source developed by Institut Francais du Petrole (IFP) as described in U.S. Pat. No. 4,505,362 (incorporated by reference herein in its entirety);
- the hammer launched source developed by OYO Corporation and described in Kennedy et al.'s "A Swept-Frequency Borehole Source for Inverse VSP and Cross-Borehole Surveying," 7$^{th}$ Geophysical Conference of the Australian Society of Exploration Geophysics (1989), Volume 20, pages 133-136 (incorporated by reference herein in its entirety); and
- the orbital vibrator developed by Conoco and described in Ziolkowksi et al.'s "Determination of Tube-Wave to Body-Wave Ratio for Conoco Borehole Orbital Source," 69th Annual International Meeting of the Society of Exploration Geophysics (1999), pages 156-159 (incorporated by reference herein in its entirety).

In general these sources are high energy sources operating at low frequency and are excited using a pulsed technique. Most of these sources are used for wireline applications.

A few sources have been developed that are clamped up against the borehole wall. Because these sources are generally more difficult to design, few sources have been developed. One source utilizes a hydraulic vibrator clamped against the borehole to oscillate a reaction mass axially or radially and is more fully described in Turpening et al.'s "Imaging with Reverse Vertical Seismic Profiles Using a Downhole, Hydraulic, Axial Vibrator," 62nd Meeting of EAGE (2000), Session P0161 (incorporated by reference herein in its entirety).

Most of the sources listed above behave like monopole sources, with the exception of the orbital vibration and the clamped vibrator sources which behave like dipole sources.

Accordingly, it is one object of the present invention to provide a downhole transducer source capable of providing the resolution required to adequately characterize the earth formation.

SUMMARY OF THE INVENTION

The present invention discloses an acoustic borehole source and method of using the source for generating elastic waves through an earth formation that may be used for logging (such as by wireline) or permanent installations. Frequencies up to at least 1 KHz may be obtained using this source.

In one embodiment of the present invention the acoustic source is comprised of a first motorized reaction mass positioned along the axis of a sonde and at least two pads. Each pad is connected to the sonde and the motorized reaction mass using pushing rods so that said when the motorized reaction mass is activated the pads urge against the earth formation to generate elastic waves. To ensure proper positioning within the borehole, the sonde is anchored against the borehole wall using at least two of the pads or using a separate anchoring means. A receiving array may be positioned along the sonde to receive elastic waves after they have passed through a portion of the earth formation.

In a second embodiment, an acoustic borehole source is comprised of a first and second motorized reaction mass positioned along the axis of a sonde and at least two pads. In this embodiment each pad is connected to both the first motorized reaction mass and the second motorized reaction mass using pushing rods. Elastic waves are generated through the earth formation by activating one or both of the motorized reaction masses. The motorized reaction masses may be preferentially activated to allow the pads to move at an angle α relative to the axis of the sonde. In this embodiment, a compression spring may be used to connect the two motorized reaction masses to ensure that the pads remain proximate the axis of the sonde during deployment downhole. Once the sonde is positioned near a region of interest in the borehole, the spring may be released to allow the pads to anchor the sonde against the borehole wall.

In a third embodiment, the acoustic borehole source includes additional pairs of motorized reaction masses so that pads may be independently, preferentially activated. In a preferred embodiment, three pads are employed. In an alternate embodiment, four pads may be used, wherein one pair of pads is commonly connected to a pair of motorized reaction masses using a first plurality of pushing rods while the other pair is commonly connected to the other pair of motorized reaction masses using a second plurality of pushing rods.

In a fourth embodiment of the present invention, a method of generating elastic waves through an earth formation is disclosed comprising: a) providing a sonde having an acoustic borehole source comprised of a first motorized reaction mass positioned along the axis of the sonde and at least two pads connected to the sonde and the first motorized reaction mass using a plurality of pushing rods; b) anchoring the sonde at a selected position within the borehole; and c) activating the first motorized reaction mass so that at least one of the pads urges against the borehole wall to generate elastic waves into the formation. Preferably, the sonde is anchored by urging at least two of the pads against the borehole wall.

In a fifth embodiment, a method of generating elastic waves through an earth formation is disclosed comprising: a) providing a sonde with two motorized reaction masses positioned along the axis of the sonde and at least two pads, wherein each pads is connected to the motorized reaction masses using a plurality of pushing rods; b) anchoring the sonde at a selected position within the borehole; and c) preferentially activating either or both of the motorized reaction masses so at least one of the pads urges against the borehole wall to generate elastic waves into the formation. In this embodiment, the activation of the reaction masses may be coordinated to encourage the propagation of elastic waves in a particular direction through the formation. Accordingly, the motorized reaction masses are activated so that at least one of the pads urges against the borehole wall at a predetermined angle $\alpha$ relative to the axis of the sonde.

In a sixth embodiment, additional pairs of motorized reaction masses are used so preferentially urge the pads against the borehole wall and induce elastic wave propagation.

In order to reach high performance, the room available along the borehole axis is used to transmit the axial motion of the source into the borehole or to convert this axial motion into a radial displacement via the pushing rod. By contrast, most conventional sources use only radial space in the borehole and are thereby limited by the width of the borehole. The source of the present invention may be customized based on radiation energy, frequency bandwidth, and resonance frequency by adjusting one or more of reaction mass weight, the stiffness of the motor and the angular position of the pushing rod relative to the source axis.

Acoustic energy may be generated in two ways, axially and radially (dipole and monopole, respectively), depending on whether the motors are driven in-phase or out-of-phase as well as the coordination of the activation of the reaction masses. Accordingly, the motorized reaction masses may be activated to allow for various modes (including, but not limited to, monopole, dipole, quadrupole) in either the axial direction (along the borehole axis) or the radial direction (perpendicular to the borehole axis). Furthermore, the elastic waves may be directed through the formation at another angle based on the activation of the motors.

Further features and embodiments will become apparent upon a reading of the detailed description in view of the attached figures.

BRIEF DESCRIPTION OF THE DRAWINGS

FIGS. 1(a), (b) and (c) are schematic diagrams of the present invention in (a) a tool wherein one end of the pad is fixed to the sonde, (b) a wireline logging tool embodiment and (c) a permanent installation embodiment.

FIGS. 2(a) and (b) are schematic drawings showing the motors when driven in-phase.

FIGS. 3(a), (b), and (c) are schematic drawings showing the motors when driven out-of-phase.

FIGS. 6(a), (b), and (c) are cross-sectional schematics showing the orientation of pads in the borehole.

DETAILED DESCRIPTION OF INVENTION

In present invention provides a downhole acoustic transducer for generating elastic waves in an underground medium. FIG. 1(a) shows a most basic embodiment of the present invention adapted for use with a wireline logging tool. FIGS. 11b) and (c) show more sophisticated versions of the present invention as adapted for employment with a wireline logging tool (FIG. 1(b)) and a permanent installation (FIG. 1(c)). The device may be used for reservoir characterization such as the determination of the bedding continuity, direction of fractures, the location of isolated pockets of oil and gas in large fields, in swept oil pocket.

Further, the device can be used as part of an acoustic imager for seismic reservoir monitoring. As a reservoir's fluids are produced or fluids are injected to enhance oil recovery, the reservoir's seismic properties change. If the change in the reservoir is large enough, it can be differentiated by seismic. It is particularly interesting to monitor the water/oil interface or the gas oil interface in order to manage the oil production. Paulsson et al. in "Reservoir Definition and Evaluation of Stemflood Technology in Alberta Tar Sands," *Leading Edge*, July 1994 present a typical example of application of the monitoring movement of an injected steam in a well, wherein tomography motion of the steam was detected.

The device may also be used to monitor underground storage of natural gas thereby managing fluctuating prices and demand. This device allows monitoring to ensure that wells can deliver or accept gas at requires flow rates (see Dumont et al., "Time Lapse Seismic," Petroleum Geoscience (2001), Volume 7, pages 155-162).

In addition to pressure measurements for monitoring gas storage, some experiments in seismic monitoring have been conducted. For example, IFP and Gas de France have monitored acoustic emission or monitored gas column using time lapse seismic (see "Use of Permanent Geophone for Microseismic Surveying of a Gas Storage Reservoir," Deflandre et al. 55th EAGE meeting Jun. 7-11, 1993 and "Reservoir Monitoring Using Permanent sources and Vertical Receiver Antennae: The Cere-la Ronde Case Study," Meunier et al., *The Leading Edge* June 2001).

Conventional seismic techniques use sources with low frequency operating range that are positioned far from the target. However, the present invention uses a downhole imager closer to the sub region of interest, requiring less energy and allowing high frequency to be transmitted. Moreover, for certain application like permanent seismic monitoring, time is not an issue and stacking will significantly improve the signal to noise ratio. In order to do stacking over a long period of time, the acoustic imager has to be repeatable. Further, the source has to be non-destructive allowing the energy to be transmitted without causing damage to the well or formation cement casing. Instead of using a pulse technique to excite the source, the present invention allows the energy to be spread out over time to further improve the signal to noise ratio. Because the signal and the noise are measured by the receiver array, the signal to noise ratio depends on the quality and type of sensors. Accordingly, the clamped source of the present invention will improve this ratio.

FIGS. 1(a), (b) and (c) are schematic illustrations of the downhole transducer (acoustic borehole source). Acoustic energy is generated into the formation 10 when two or more pads 30 contact the formation wall 20. In the most basic embodiment of FIG. 1(a), the pads are connected to a motor 50 with a reaction mass 70 using pushing rod 40a and to the sonde 80 using pushing rod 40b. The pads may be made of any material able to withstand the temperatures and pressures of the borehole environment as well as impact against the formation wall as induced by the motors.

In a second embodiment shown in FIG. 1(b), motors 50a, 50b having reaction masses 70a, 70b are located on either side of the pads 30 and actuate the pads 30. Pushing rods 40a, 40b attach either end of the pads 30 to a motor 50a, 50b and a spring 60 connects the two motors. While the depicted embodiments show separate reaction masses 70a, 70b and motors 50a, 50b, one skilled in the art would recognize that the motors may be designed to provide sufficient energy to eliminate the need for separate reaction masses.

Prior to acoustic energy generation, the system is secured in the borehole by urging the pads 30 against the borehole wall 20 by the motors 50a, 50b applying a static force. When the motors 50a, 50b are activated, the harmonic axial force they generate is transferred as a harmonic radial force into the formation.

The non-limiting embodiment of FIG. 1(b) shows the apparatus adapted for connection to a wireline logging tool at 80. FIG. 1(c) is a non-limiting embodiment showing a permanent installation wherein production may be maintained via completion hardware 90. The sonde 80 or the completion hardware 90 may be equipped with receivers (not shown) to receive the elastic wave after it has passed through the earth formation. To enhance the control of the pads and the acoustic signal generated, the pushing rods may be hingedly connected to the pads and/or the motorized reaction masses.

Figure 2:
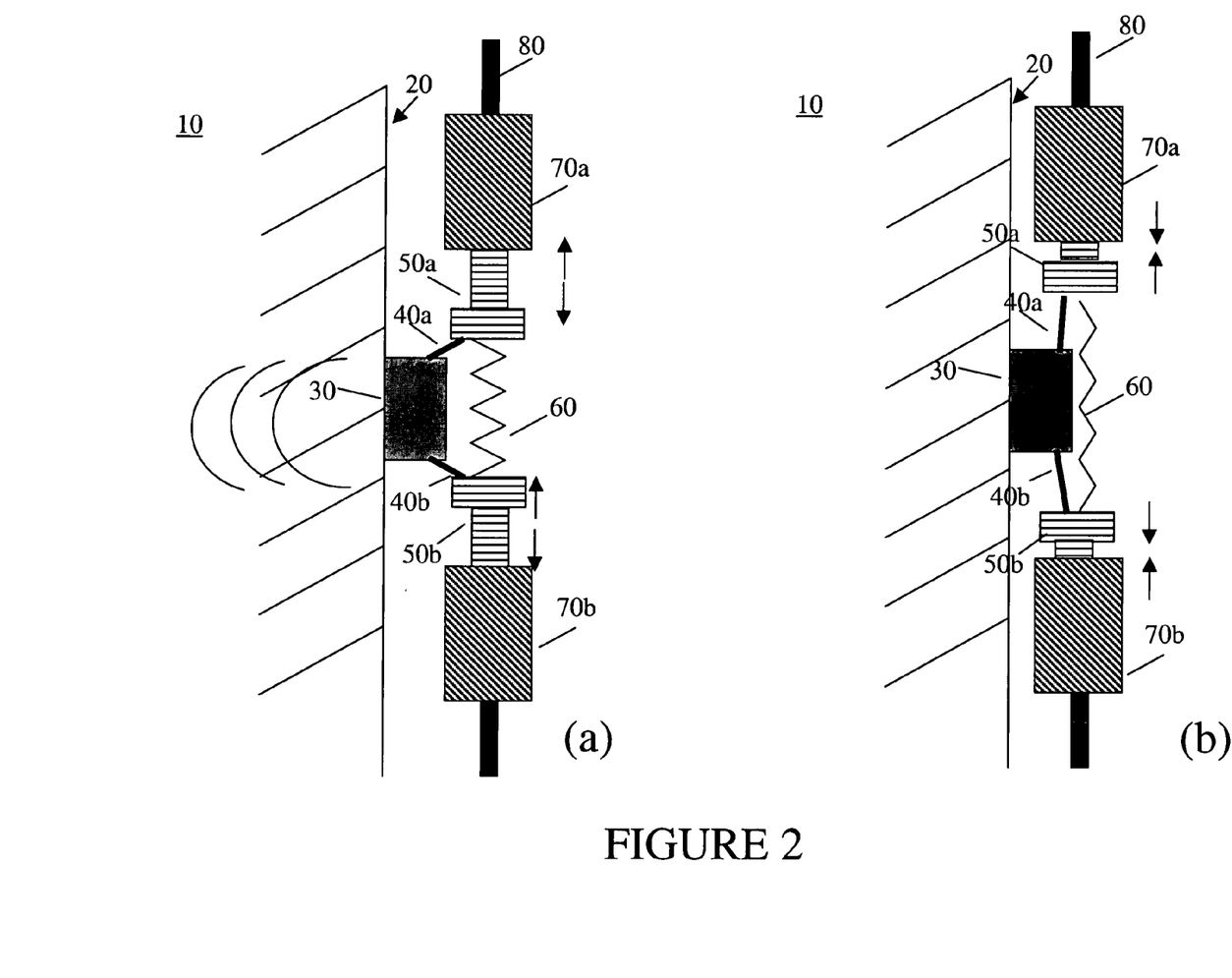

FIGS. 2(a) and (b) are schematics depicting the deployment of a wireline tool adapted with the acoustic transducer of the present invention wherein the motors 50a, 50b are operated in-phase. After the pads 30 are engaged against the formation wall 20, the motors 50a, 50b are activated to substantially simultaneously expand (see FIG. 2(a)), thereby forcing the pad 30 against the formation wall 20 and transmitting acoustic energy 100 radially into the formation 10. As shown in FIG. 2(b), when the motors 50a, 50b are contracted, the pad 30 releases from the formation wall 20 (but does not necessarily disengage from the formation wall 20).

Figure 3:
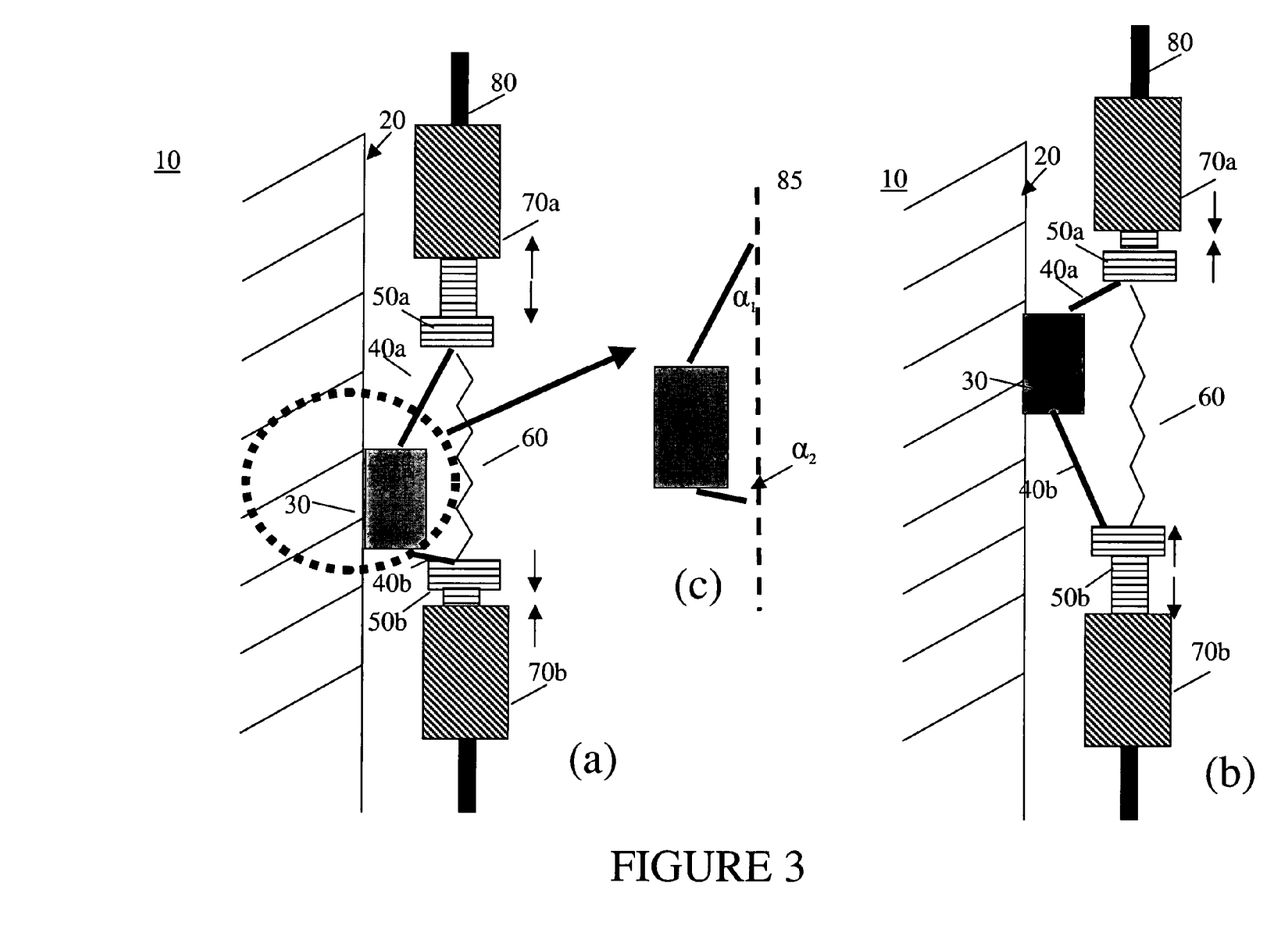

FIGS. 3(a) and (b) are schematics showing the movement of the pads 30 when the motors 50a, 50b are activated out-of-phase. When motors 50a, 50b are driven out-of-phase (i.e. contracting one motor while expanding the other), the pads 30 may be moved axially to create a wave in the formation 10, such as a dipole wave. If the motors are driven "perfectly" or nearly perfectly (i.e. 180° or nearly 180° out-of-phase), then angle α will be identical or nearly identical for each pushing rod. However, if the motors are "preferentially" activated (i.e. coordinating the timing of the activation of each motor), then the pushing angle α for each in a pair of pushing rods ($\alpha_1$ and $\alpha_2$, respectively) associated with each pad may be influenced to encourage the propagation of waves through the formation in a particular direction. FIG. 3(c) is an enlargement of the pad/pushing rod configuration showing the influence on angles $\alpha_1$ and $\neq_2$ relative to the axis of the sonde 85 (or borehole in the case of "permanent" installations).

As shown in FIG. 3(a), if motor 50a is expanded while motor 50b is contracted, the pad 30 will move "down" the borehole wall 20. Likewise, if motor 50a is contracted while motor 50b is expanded, the pad 30 will move "up" the borehole wall 20. Repeating this activation pattern will induce a compressional wave (ant its corresponding shear wave) in the formation 10. The direction of the compressional wave through the formation may be influences by coordinating the activation of the two motors 50a, 50b. The contraction/expansion of motors 50a, 50b may be timed so that the operator may direct the compressional wave through the formation.

Figure 4:
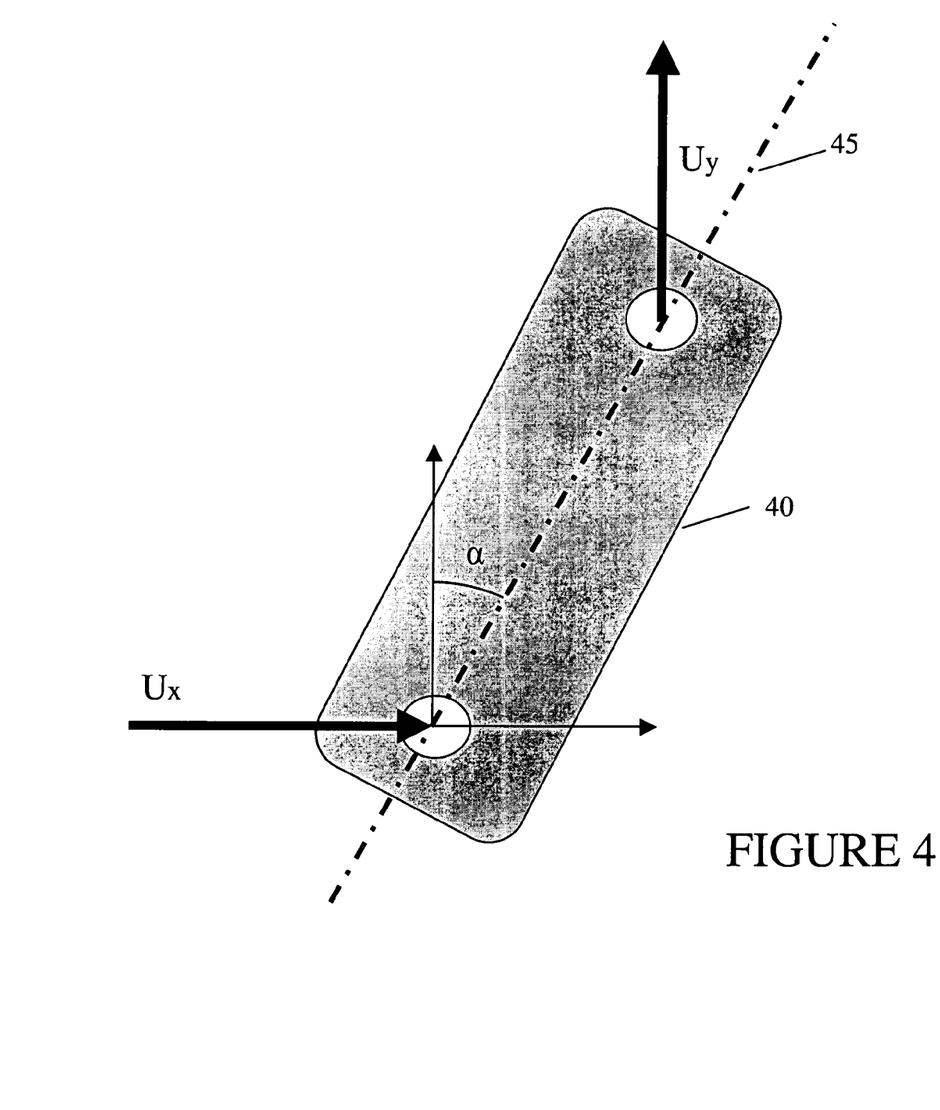
FIG. 4 is a schematic illustration showing how impedance and frequency resonance are related to the pushing rod angle, $\alpha$.

As shown in FIG. 4, pushing rods 40a, 40b convert the axial motion of motors 50a, 50b into a radial one. By controlling angle α (between the axis of the sonde for wireline applications or the borehole for permanent installations and the pushing rod 40a, 40b), the resonance and frequency of the formation may be tuned (or "directed") relative to the motors/reaction masses. A displacement Ux at low angle α produces high displacement Uy but low force in the y direction. By contrast, at angle α close to 90 degrees, Ux produces low Uy but high force in the y direction.

Figure 5:
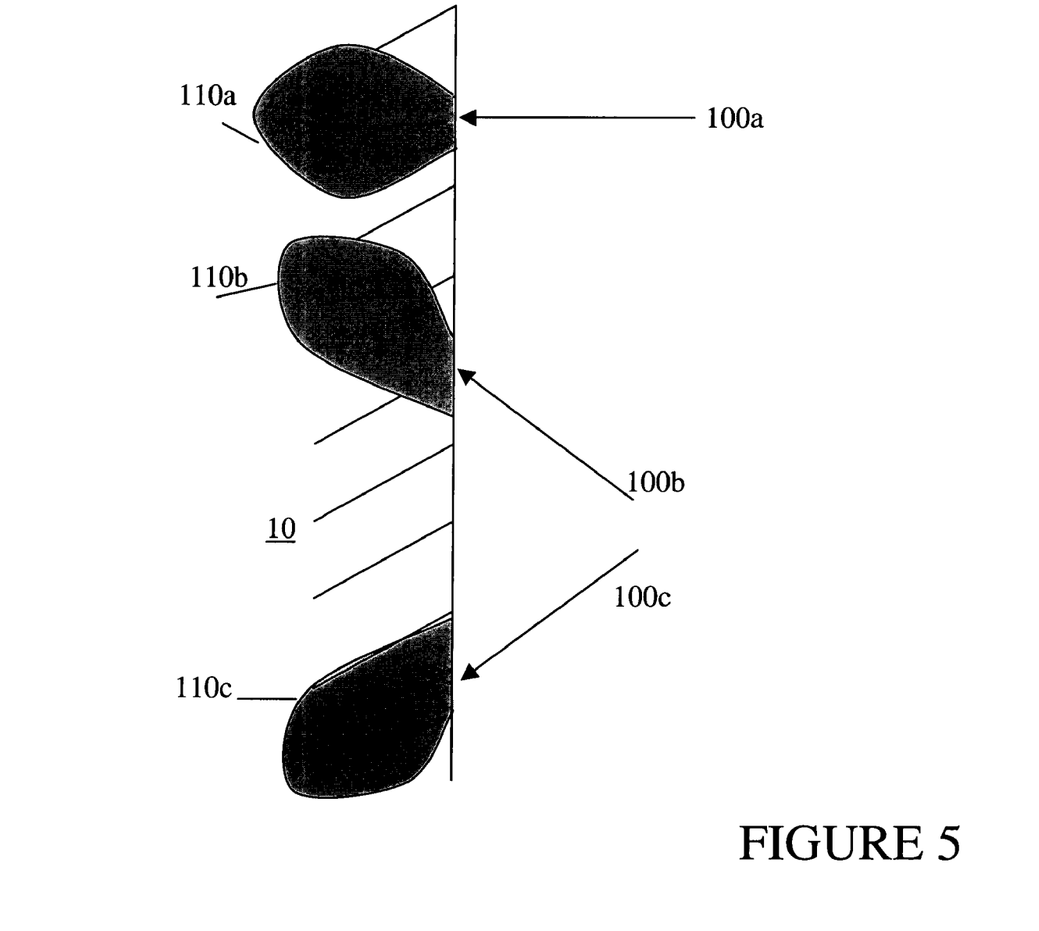
FIG. 5 is a schematic depicting how compression waves may be directed through the formation.

As shown in FIG. 5, a force at the angle shown as 100a will produce a corresponding compressional wave pattern 110a (and a corresponding shear wave pattern, not shown). By influencing the angle of the force 100b, 100c, such as by timing the activation of the motors, corresponding compressional waves 11b, 11c (and their corresponding shear waves, not shown) may be preferentially directed through the formation 10.

Various wave modes may be created in the formation depending on the number of pads 30 used as well as the timing of the motor activation. One skilled in the art would recognize that if the pads are also used to anchor the system (i.e., no other anchoring means are used) at least two pads 30 should be used to ensure that the system is adequately anchored against the borehole wall 20.

Figure 6:
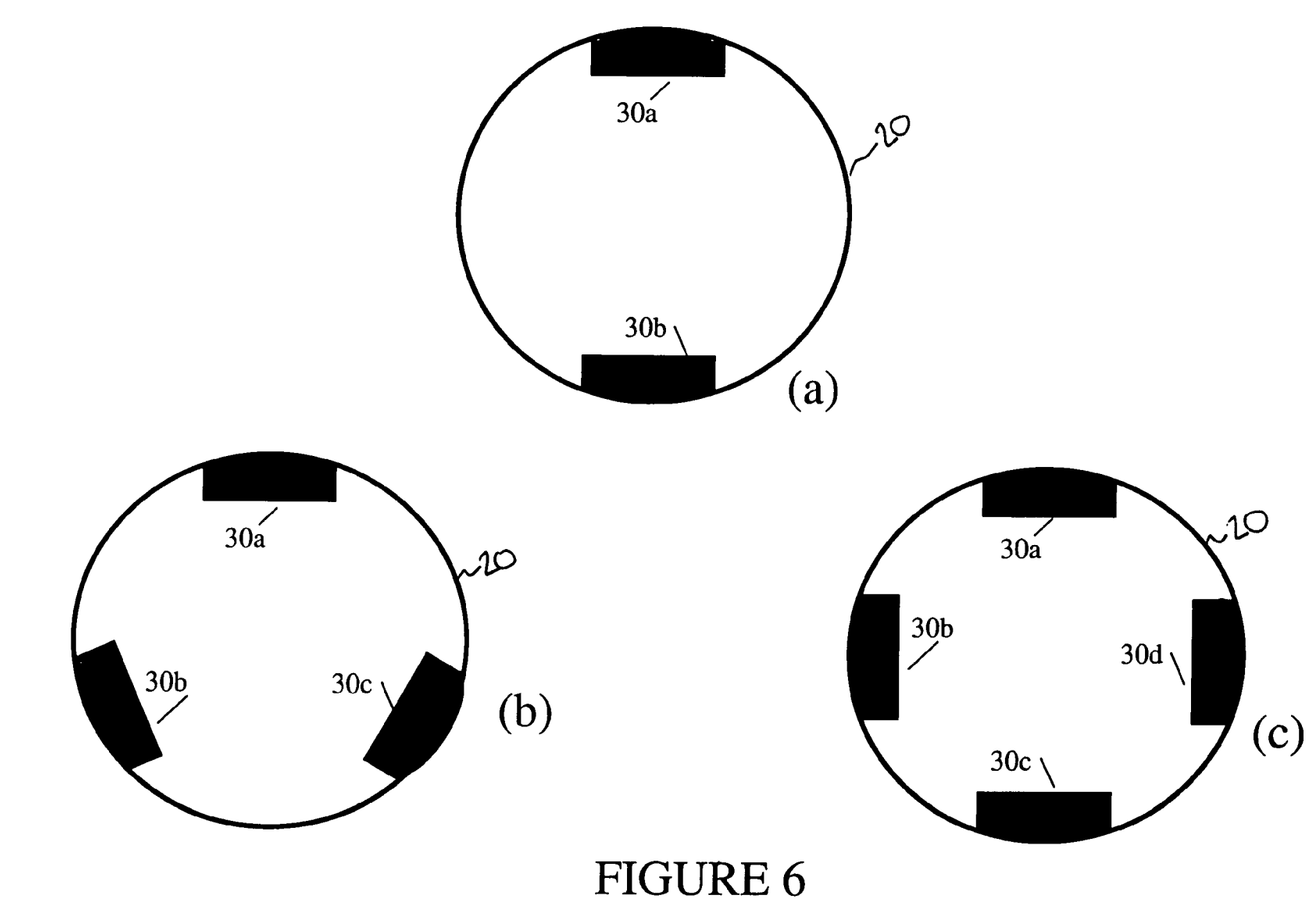

FIG. 6(a) shows a two-pad 30a, 30b configuration in accordance with the present invention. Using this configuration, if motors 50a, 50b are fired in-phase (radially), a monopole/quadrupole mode can be created in the formation. Of the motors are fired out-of-phase (axially), a dipole mode may be induced.

FIG. 6(b) shows a three-pad 30a, 30b, and 30c configuration in accordance with the present invention. When activated radially, these pads will produce a monopole mode; when activated axially, they will produce a dipole mode.

FIG. 6(c) shows a four-pad 30a, 30b, 30c, 30d configuration in accordance with the present invention. If all four pads are activated simultaneously, then a monopole (radial activation) or a dipole (axial activation) mode may be generated. However, the device may be configured to allow for preferential activation of individual pads or pairs of pads.

For example, additional motors may be employed to activate the pads. Additional motors/reaction masses may be used to preferentially active pads. For example, one pair of motors may be used to activate pads 30a, 30b and a separate pair of motors for pad 30c of FIG. 6(b). Similarly, one pair of motors may be used to activate pads 30a, 30c and a second pair of motors may be used to activate pads 30b, 30d.

Likewise, the pads may be piezoelectric sources that may be individually activated. Such configurations allow monopole, dipole, quadrupole and other order modes to be generated axially or radially in the borehole, depending on the sequencing of the activation of the motors or pad. It is noted that specific pad/motor configurations may be preferred depending on the nature of the formation encountered, for example to adapt the impedance in a soft formation.

The motors may be manufactured using piezoelectric, magnetostrictive, or electrodynamic materials or include hydraulic actuator(s). Alternatively, an impact bullet mechanism may replace the conventional motor to react against the pushing rods. The bullet may be launched by any electrodynamics or mechanical device, such as an electrical coil or spring (see for example commonly owned U.S. patent application Ser. No. 10/138,274, filed Apr. 25, 2002, incorporated by reference herein in its entirety).

Figure 1:
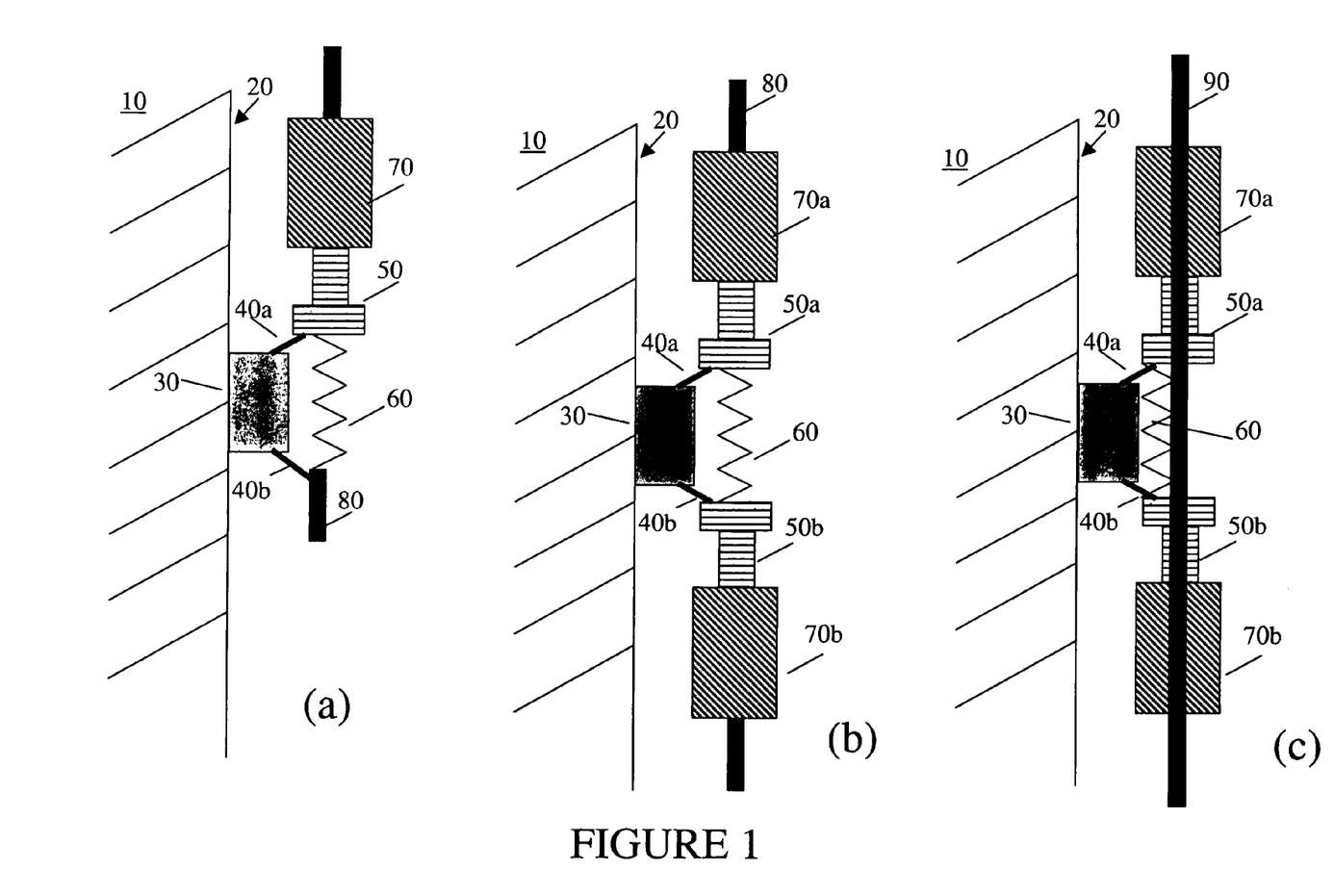

During deployment, the pads are maintained in a retracted position using a spring 60 (see FIGS. 1(*a*)-(*c*)). When the tool is positioned within the borehole, the pads may be urged against the borehole wall using a piston actuated by a hydraulic line. A pre-stressed force is applied to maintain the device in compression. The radial activation of the pads does not require a very high static force; a harmonic axial force induced during axial activation requires a high compressive force (depending on the friction coefficient between the borehole and the pads).

The present invention may be implemented as a tool conveyed via wireline, slick line or coiled tubing; or it may be embedded in production tubing or any suitable component of a completion. The pressure balance may be ensured by a piston or by a bellows, notice that the protective sleeve designed in a particularly way, (circular ribs made like a bellow), may be used as a pressure compensation device.

While the invention has been described herein with reference to certain examples and embodiments, it will be evident that various modifications and changes may be made to the embodiments described above without departing from the scope and spirit of the invention as set forth in the claims.

What is claimed is:

1. An acoustic borehole source for generating elastic waves through an earth formation at a designated location via a wall comprising:
   a first motorized reaction mass positioned along an axis of a sonde; and
   at least two pads, wherein each of said at least two pads are connected to said sonde and said first motorized reaction mass using a plurality of variable angle pushing rods to convert an axial motion into a radial motion so that said at least two pads generate elastic waves through the earth formation upon activation of said first motorized reaction mass as a result of impact of the pads against the wall;
   wherein the impedance of the acoustic borehole source may be controlled using said plurality of variable angle pushing rods;
   wherein activation of said first motorized reaction mass provides variable location adjustment for said at least two pads while said at least two pads are positioned at the designated location of the acoustic borehole source, such that said at least two pads generate elastic waves through the earth formation at multiple locations while at the designated location.

2. The acoustic borehole source of claim 1, further comprising anchoring means to anchor said sonde in a borehole located in the earth formation.

3. The acoustic borehole source of claim 1, wherein at least two of said pads are used to anchor said sonde in a borehole located in the earth formation.

4. The acoustic borehole source of claim 1, further comprising a receiver array positioned along said sonde for receiving said elastic waves after said elastic waves have passed through a portion of said earth formation.

5. The acoustic borehole source of claim 1, wherein said plurality of pushing rods are hingedly connected to the first reaction mass and the pads.

6. The acoustic borehole source of claim 1, wherein the weight of the motorized reaction masses are designed to accommodate a specific source property, wherein said source property is selected from the group consisting of radiation energy, frequency bandwidth, and resonance frequency.

7. The acoustic borehole source of claim 1, wherein the stiffness of the motorized reaction masses are designed to accommodate a specific source property, wherein said source property is selected from the group consisting of radiation energy, frequency bandwidth, and resonance frequency.

8. An acoustic borehole source for generating elastic waves through an earth formation at a designated location via a wall comprising:
   a first motorized reaction mass and a second motorized reaction mass positioned along an axis of a sonde; and
   at least two pads, wherein each of said at least two pads are connected to said first motorized reaction mass and said second motorized reaction mass using a plurality of variable angle pushing rods to convert an axial motion into a radial motion, so that said at least two pads generate elastic waves through the earth formation upon activation of at least one of said first and second motorized reaction masses as a result of impact of the pads against the wall;
   wherein the impedance of the acoustic borehole source may be controlled using said plurality of variable angle pushing rods;
   wherein activation of said first motorized reaction mass provides variable location adjustment for said at least two pads while said at least two pads are positioned at the designated location of the acoustic borehole source, such that said at least two pads generate elastic waves through the earth formation at multiple locations while at the designated location.

9. The acoustic borehole source of claim 8, wherein said first and second motorized reaction masses are connected to opposite ends of each pad of said at least two pads using said pushing rods such that said pads move at an angle α relative to said axis of said sonde.

10. The acoustic borehole source of claim 9, further comprising a compression spring connecting said first and second motorized reaction masses.

11. The acoustic borehole source of claim 8, comprising at least three pads and a third and fourth motorized reaction masses, wherein at least two of said at least three pads are commonly connected at opposite ends to said first and second motorized reaction masses using a first plurality of pushing rods and wherein at least one of said at least three pads is connected at opposite ends to said third and fourth motorized reaction masses using a second plurality of pushing rods.

12. The acoustic borehole source of claim 8, further comprising anchoring means to anchor said sonde in a borehole within the earth formation.

13. The acoustic borehole source of claim 8, wherein at least two of said pads are used to anchor said sonde in a borehole within the earth formation.

14. The acoustic borehole source of claim 13, further comprising a receiver array positioned along said sonde for receiving said elastic waves after said elastic waves have passed through a portion of said earth formation.

15. The acoustic borehole source of claim 8, wherein said plurality of pushing rods are hingedly connected to the first reaction mass and the at least two pads.

16. The acoustic borehole source of claim 8, wherein the weight of the motorized reaction masses are designed to accommodate a specific source property, wherein said source property is selected from the group consisting of radiation energy, frequency bandwidth, and resonance frequency.

17. The acoustic borehole source of claim 8, wherein the stiffness of the motorized reaction masses are designed to accommodate a specific source property, wherein said source property is selected from the group consisting of radiation energy, frequency bandwidth, and resonance frequency.

18. An acoustic borehole source for generating elastic waves through an earth formation at a designated location via a wall comprising:
- a first motorized reaction mass positioned along an axis of a borehole;
- at least two pads, wherein each of said at least two pads are connected to said first motorized reaction mass and said borehole using a plurality of variable angle pushing rods to convert an axial motion into a radial motion, so that said at least two pads generate elastic waves through the earth formation upon activation of said first motorized reaction mass as a result of contact of the pads with the wall; and
- wherein the impedance of the acoustic borehole source may be controlled using said plurality of variable angle pushing rods;
- wherein activation of said first motorized reaction mass provides variable location adjustment for said at least two pads while said at least two pads are positioned at the designated location of the acoustic borehole source, such that said at least two pads generate elastic waves through the earth formation at multiple locations while at the designated location.

19. The acoustic borehole source of claim 18, further comprising a receiver array positioned along said borehole for receiving said elastic waves after said elastic waves have passed through a portion of said earth formation.

20. The acoustic borehole source of claim 18, wherein said plurality of pushing rods are hingedly connected to the first reaction mass and the at least two pads.

21. The acoustic borehole source of claim 18, wherein the weight of the motorized reaction masses are designed to accommodate a specific source property, wherein said source property is selected from the group consisting of radiation energy, frequency bandwidth, and resonance frequency.

22. The acoustic borehole source of claim 18, wherein the stiffness of the motorized reaction masses are designed to accommodate a specific source property, wherein said source property is selected from the group consisting of radiation energy, frequency bandwidth, and resonance frequency.

23. An acoustic borehole source for generating elastic waves through an earth formation at a designated location via a wall comprising:
- a first motorized reaction mass and a second motorized reaction mass positioned along an axis of a borehole; and
- at least two pads, wherein each of said at least two pads are connected to said first motorized reaction mass and said second motorized reaction mass using a plurality of variable angle pushing rods to convert an axial motion into a radial motion, so that said at least two pads generate elastic waves through the earth formation upon activation of at least one of said first and second motorized reaction masses as a result of contact of the pads with the wall;
- wherein the impedance of the acoustic borehole source may be controlled using said plurality of variable angle pushing rods;
- wherein activation of said first motorized reaction mass provides variable location adjustment for said at least two pads while said at least two pads are positioned at the designated location of the acoustic borehole source, such that said at least two pads generate elastic waves through the earth formation at multiple locations while at the designated location.

24. The acoustic borehole source of claim 23, wherein said first and second motorized reaction masses are connected to opposite ends of each pad so that said pads move at an angle α relative to said axis of the borehole.

25. The acoustic borehole source of claim 24, further comprising a compression spring connecting said first and second motorized reaction masses.

26. The acoustic borehole source of claim 23, comprising at least three pads and a third and fourth motorized reaction masses, wherein at least two of said at least three pads are commonly connected at opposite ends to said first and second motorized reaction masses using a first plurality of pushing rods and wherein at least one of said at least three pads is connected at opposite ends to said third and fourth motorized reaction masses using a second plurality of pushing rods.

27. The acoustic borehole source of claim 23, further comprising a receiver array positioned along said borehole for receiving said elastic waves after said elastic waves have passed through a portion of said earth formation.

28. The acoustic borehole source of claim 23, wherein said plurality of pushing rods are hingedly connected to the first reaction mass and the at least two pads.

29. The acoustic borehole source of claim 23, wherein the weight of the motorized reaction masses are designed to accommodate a specific source property, wherein said source property is selected from the group consisting of radiation energy, frequency bandwidth, and resonance frequency.

30. The acoustic borehole source of claim 23, wherein the stiffness of the motorized reaction masses are designed to accommodate a specific source property, wherein said source property is selected from the group consisting of radiation energy, frequency bandwidth, and resonance frequency.

31. A method of generating elastic waves through an earth formation at a designated location via a wall comprising:
- a. providing a sonde having an acoustic borehole source comprised of a first motorized reaction mass positioned along an axis of said sonde and at least two pads, wherein each of said at least two pads are connected to said sonde and said first motorized reaction mass using a plurality of variable angle pushing rods so as to convert an axial motion into a radial motion wherein the impedance of the acoustic borehole source may be controlled using said plurality of variable angle pushing rods;
- b. anchoring said sonde at a selected position within a borehole located within the earth formation;
- c. activating said first motorized reaction mass so that at least one of said at least two pads urges against a wall of said borehole to generate elastic waves into the earth formation as a result of impact of the pad against the wall; and
- wherein activation of said first motorized reaction mass provides variable location adjustment for said at least two pads while said at least two pads are positioned at the designated location of the acoustic borehole source, such that said at least two pads generate elastic waves through the earth formation at multiple locations while at the designated location.

32. The method of claim 31, further comprising receiving said elastic waves after said elastic waves have passed through a portion of said earth formation.

33. The method of claim 31, wherein anchoring said sonde comprises urging at least two of said pads against said borehole wall.

34. A method of generating elastic waves through an earth formation at a designated location via a wall comprising:
   a. providing a sonde having an acoustic borehole source comprised of a first and a second motorized reaction masses positioned along an axis of said sonde and at least two pads, wherein each of said at least two pads are connected to said first motorized reaction mass and said second motorized reaction mass using a plurality of variable angle pushing rods so as to convert an axial motion into a radial motion wherein the impedance of the acoustic borehole source may be controlled using said plurality of variable angle pushing rods;
   b. anchoring said sonde at a selected position within the a borehole within the earth formation; and
   c. preferentially activating said first or second motorized reaction masses so that at least one of said at least two pads urges against a wall of the borehole to generate elastic waves into the earth formation as a result of impact of the pad against the borehole wall, wherein direction of the elastic waves is a function of phase of activation of the first motorized reaction mass relative to the second motorized reaction mass;
   wherein activation of said first motorized reaction mass provides variable location adjustment for said at least two pads while said at least two pads are positioned at the designated location of the acoustic borehole source, such that said at least two pads generate elastic waves through the earth formation at multiple locations while at the designated location.

35. The method of claim 34, further comprising coordinating the activation of said first or second motorized reaction masses so that at least one of said pads urges against said borehole wall at a predetermined angle α relative to the axis of said sonde.

36. The method of claim 34, wherein anchoring said sonde comprises urging at least two of said pads against said borehole wall.

37. A method of generating elastic waves through an earth formation at a designated location via a wall comprising:
   a. providing a sonde having an acoustic borehole source comprised of a first, second, third and fourth motorized reaction masses positioned along an axis of said sonde and at least three pads, wherein at least two of said pads are commonly connected at opposite ends to said first and second motorized reaction masses using a first plurality of variable angle pushing rods that convert an axial motion into a radial motion and wherein at least one of said pads is connected at opposite ends to said third and fourth motorized reaction masses using a second plurality of variable angle pushing rods that convert an axial motion into a radial motion wherein the impedance of the acoustic borehole source may be controlled using said plurality of variable angle pushing rods;
   b. anchoring said sonde at a selected position within a borehole located within the formation; and
   c. preferentially activating said first, second, third or fourth motorized reaction masses so that at least one of said at least two pads urges against a wall of the borehole to generate elastic waves through said earth formation as a result of impact of the pad against the borehole wall, wherein direction of the elastic waves is a function of phase of activation of the first, second, third and fourth motorized reaction masses relative to each other;
   wherein activation of said first motorized reaction mass provides variable location adjustment for said at least two pads while said at least two pads are positioned at the designated location of the acoustic borehole source, such that said at least two pads generate elastic waves through the earth formation at multiple locations while at the designated location.

38. The method of claim 37, further comprising receiving said elastic waves after said elastic waves have passed through a portion of said earth formation.

39. The method of claim 37, further comprising coordinating the activation of said first, second, third and fourth motorized reaction masses so that at least one of said pads urges against said borehole wall at a predetermined angle α relative to the axis of said sonde.

40. The method of claim 37, wherein anchoring said sonde comprises urging at least two of said pads against said borehole wall.

41. A method of generating elastic waves through an earth formation at a designated location comprising:
   a. positioning an acoustic borehole source along a borehole wall in the earth formation wherein said acoustic borehole source is comprised of a first motorized reaction mass positioned along an axis of said borehole wall and at least two pads, wherein each of said at least two pads are connected to said sonde and said first motorized reaction mass using a plurality of variable angle pushing rods to convert an axial motion into a radial motion, wherein the impedance of the acoustic borehole source may be controlled using said plurality of variable angle pushing rods; and
   b. activating said first motorized reaction mass so that at least one of said at least two pads urges against said borehole wall to generate elastic waves into the earth formation as a result of impact of the pad against the borehole wall;
   wherein activation of said first motorized reaction mass provides variable location adjustment for said at least two pads while said at least two pads are positioned at the designated location of the acoustic borehole source, such that said at least two pads generate elastic waves through the earth formation at multiple locations while at the designated location.

42. The method of claim 41, further comprising receiving said elastic waves after said elastic waves have passed through a portion of said earth formation.

43. A method of generating elastic waves through an earth formation at a designated location comprising:
   a. positioning an acoustic borehole source along a borehole wall in the earth formation wherein said acoustic borehole source is comprised of a first and a second motorized reaction masses positioned along an axis of said borehole wall and at least two pads, wherein each of said at least two pads are connected to said first motorized reaction mass and said second motorized reaction mass using a plurality of variable angle pushing rods to convert an axial motion into a radial motion, wherein the impedance of the acoustic borehole source may be controlled using said plurality of variable angle pushing rods; and
   b. preferentially activating said first or second motorized reaction masses so that at least one of said at least two pads urges against said borehole wall to generate elastic waves into the earth formation as a result of impact of the pad against the borehole wall, wherein direction of the elastic waves is a function of phase of activation of the first motorized reaction mass relative to the second motorized reaction mass;

wherein activation of said first motorized reaction mass provides variable location adjustment for said at least two pads while said at least two pads are positioned at the designated location of the acoustic borehole source, such that said at least two pads generate elastic waves through the earth formation at multiple locations while at the designated location.

44. The method of claim 43, further comprising coordinating the activation of said first or second motorized reaction masses so that at least one of said pads urges against said borehole wall at a predetermined angle α relative to the axis of said borehole.

45. A method of generating elastic waves through an earth formation at a designated location comprising:
   a. positioning an acoustic borehole source along a borehole wall in the earth formation wherein said acoustic borehole source is comprised of a first, second, third and fourth motorized reaction masses positioned along an axis of said borehole wall and at least three pads, wherein at least two of said pads are commonly connected at opposite ends to said first and second motorized reaction masses using a first plurality of variable angle pushing rods to convert an axial motion into a radial motion and wherein at least one of said pads is connected at opposite ends to said third and fourth motorized reaction masses using a second plurality of variable angle pushing rods to convert an axial motion into a radial motion, wherein the impedance of the acoustic borehole source may be controlled using said plurality of variable angle pushing rods;
   b. anchoring said sonde at the designated location within the borehole wall; and
   c. preferentially activating said first, second, third or fourth motorized reaction masses so that at least one of said at least two pads urges against said borehole wall to generate elastic waves through said earth formation as a result of impact of the pad against the borehole wall, wherein direction of the elastic waves is a function of phase of activation of the first, second, third and fourth motorized reaction masses relative to each other;
   wherein activation of said first motorized reaction mass provides variable location adjustment for said at least two pads while said at least two pads are positioned at the designated location of the acoustic borehole source, such that said at least two pads generate elastic waves through the earth formation at multiple locations while at the designated location.

46. The method of claim 45, further comprising receiving said elastic waves after said elastic waves have passed through a portion of said earth formation.

47. The method of claim 45, further comprising coordinating the activation of said first, second, third and fourth motorized reaction masses so that at least one of said pads urges against said borehole wall at a predetermined angle α relative to the axis of said borehole.

48. The acoustic borehole source of claim 1, wherein the impedance of the acoustic borehole source may be controlled using said plurality of variable angle pushing rods such that a first individual variable angle pushing rod and a second individual variable angle pushing rod of said plurality of variable angle pushing rods have an ability to have different angles relative to said axis of said sonde.

49. The acoustic borehole source of claim 8, wherein such that a first individual variable angle pushing rod and a second individual variable angle pushing rod of said plurality of variable angle pushing rods have an ability to have different angles relative to said axis of said sonde.

50. The acoustic borehole source of claim 18, wherein the impedance of the acoustic borehole source may be controlled using said plurality of variable angle pushing rods such that a first individual variable angle pushing rod and a second individual variable angle pushing rod of said plurality of variable angle pushing rods have an ability to have different angles relative to said axis of said borehole.

51. The acoustic borehole source of claim 23, wherein the impedance of the acoustic borehole source may be controlled using said plurality of variable angle pushing rods such that a first individual variable angle pushing rod and a second individual variable angle pushing rod of said plurality of variable angle pushing rods have an ability to have different angles relative to said axis of said borehole.

52. The method of claim 31, wherein the impedance of the acoustic borehole source may be controlled using said plurality of variable angle pushing rods such that a first individual variable angle pushing rod and a second individual variable angle pushing rod of said plurality of variable angle pushing rods have an ability to have different angles relative to said axis of said sonde.

53. The method of claim 34, wherein the impedance of the acoustic borehole source may be controlled using said plurality of variable angle pushing rods such that a first individual variable angle pushing rod and a second individual variable angle pushing rod of said plurality of variable angle pushing rods have an ability to have different angles relative to said axis of said sonde.

54. The method of claim 37, wherein the impedance of the acoustic borehole source may be controlled using said plurality of variable angle pushing rods such that a first individual variable angle pushing rod and a second individual variable angle pushing rod of said plurality of variable angle pushing rods have an ability to have different angles relative to said axis of said sonde.

55. The method of claim 41, wherein the impedance of the acoustic borehole source may be controlled using said plurality of variable angle pushing rods such that a first individual variable angle pushing rod and a second individual variable angle pushing rod of said plurality of variable angle pushing rods have an ability to have different angles relative to said axis of said borehole wall.

56. The method of claim 43, wherein the impedance of the acoustic borehole source may be controlled using said plurality of variable angle pushing rods such that a first individual variable angle pushing rod and a second individual variable angle pushing rod of said plurality of variable angle pushing rods have an ability to have different angles relative to said axis of said borehole wall.

57. The method of claim 45, wherein the impedance of the acoustic borehole source may be controlled using said plurality of variable angle pushing rods such that a first individual variable angle pushing rod and a second individual variable angle pushing rod of said plurality of variable angle pushing rods have an ability to have different angles relative to said axis of said borehole wall.

* * * * *